(12) United States Patent
Liu et al.

(10) Patent No.: US 10,110,640 B2
(45) Date of Patent: Oct. 23, 2018

(54) COMMUNICATION METHOD AND COMMUNICATION DEVICE SUPPORTING UNIFORM RESOURCE IDENTIFIER

(71) Applicant: MediaTek Singapore Pte. Ltd., Singapore (SG)

(72) Inventors: Qinglei Liu, Chengdou (CN); Kaiduan Cao, Chengdou (CN); Bang Fu, Chengdou (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 82 days.

(21) Appl. No.: 15/262,013

(22) Filed: Sep. 12, 2016

(65) Prior Publication Data
US 2017/0093928 A1   Mar. 30, 2017

(30) Foreign Application Priority Data
Sep. 25, 2015   (CN) .......................... 2015 1 0622706

(51) Int. Cl.
| | |
|---|---|
| *H04L 29/06* | (2006.01) |
| *H04L 29/12* | (2006.01) |
| *H04W 76/11* | (2018.01) |
| *H04W 80/10* | (2009.01) |

(52) U.S. Cl.
CPC ...... *H04L 65/1016* (2013.01); *H04L 61/3085* (2013.01); *H04L 65/1069* (2013.01); *H04W 76/11* (2018.02); *H04L 61/308* (2013.01); *H04L 61/605* (2013.01); *H04W 80/10* (2013.01)

(58) Field of Classification Search
CPC ............. H04L 65/1016; H04L 61/3085; H04L 61/308; H04L 61/605; H04W 76/021; H04W 80/10
See application file for complete search history.

(56) References Cited

U.S. PATENT DOCUMENTS

| | | | |
|---|---|---|---|
| 2007/0043829 A1* | 2/2007 | Dua .................... | H04L 29/1216 709/219 |
| 2011/0299458 A1* | 12/2011 | Shekalim ............... | H04L 12/14 370/328 |

(Continued)

*Primary Examiner* — Duc C Ho
(74) *Attorney, Agent, or Firm* — Winston Hsu

(57) ABSTRACT

Communication methods supporting uniform resource identifier applicable to communication devices supporting uniform resource identifier and communication devices are provided. The communication device includes at least one processor and at least one memory including program code, wherein when the program code is executed by the processor, the communication device is configured to: receive a communication input comprising a telephone number or a uniform resource identifier; determine whether the communication input comprises a uniform resource identifier; select a session initiation protocol account or an IP multimedia subsystem account registered in the communication device when the communication input comprises a uniform resource identifier; and utilize the selected session initiation protocol account or IP multimedia subsystem account to make a phone call to an account corresponding to the uniform resource identifier of the communication input. Through the present invention, better communication efficiency and elasticity can be obtained.

5 Claims, 4 Drawing Sheets

(56) References Cited

U.S. PATENT DOCUMENTS

2013/0196697 A1\* 8/2013 Lew ................. H04W 4/14
　　　　　　　　　　　　　　　　　　　　455/466
2013/0227662 A1\* 8/2013 Crampton ........... H04L 63/10
　　　　　　　　　　　　　　　　　　　　726/6

\* cited by examiner

COMMUNICATION METHOD AND COMMUNICATION DEVICE SUPPORTING UNIFORM RESOURCE IDENTIFIER

BACKGROUND

Field of the Invention

The present invention relates to a communication method and a communication device, and more particularly, to a communication method and a communication device supporting uniform resource identifier.

Background of the Invention

AS related technology keeps improving, functions of mobile devices become more powerful. Current mobile devices not only can make phone calls, but also can execute functions such as satellite positioning and web browsing. Under development of the fourth generation mobile communication technique, the mobile devices can make calls through an IP multimedia subsystem (IMS) utilizing a uniform resource identifier (URI). The uniform resource identifier comprises a user name and a domain name. For example, the uniform resource identifier can be represented as "abcde@xyz.com". "abcde" is a user name, and "xyz.com" is a domain name. Since the IP multimedia subsystem can execute functions such as video calls, video conferences, instant messaging, and multimedia services, a user can use the IP multimedia subsystem to make phone calls for communicating with other people in a more efficient way.

However, in current technology, a telephone interface of the mobile device can only receive a telephone number input. The user can not directly input the uniform resource identifier into the telephone interface to make a phone call through the IP multimedia subsystem. Therefore, the user cannot use the functions of the UP multimedia subsystem conveniently.

SUMMARY

In accordance with an aspect of the present invention, a communication method supporting uniform resource identifier applicable to a communication device is provided. The communication method comprises receiving a communication input comprising a telephone number or a uniform resource identifier; determining whether the communication input comprises a uniform resource identifier; selecting a session initiation protocol account or an IP multimedia subsystem account registered in the communication device when the communication input comprises a uniform resource identifier; and utilizing the selected session initiation protocol account or IP multimedia subsystem account to make a phone call to an account corresponding to the uniform resource identifier of the communication input. In particular, the method further comprises determining whether a user name of the uniform resource identifier of the communication input is a number when the phone call is failed; and using the number of the user name to make a second phone call when determining that the user name of the uniform resource identifier of the communication input is a number. In some embodiments, the method further comprises when a plurality of session initiation protocol accounts and/or IP multimedia subsystem accounts are registered in the communication device, allowing a user to select one of the plurality of session initiation protocol accounts and/or IP multimedia subsystem accounts to make a phone call, or the selection is proceeded automatically.

In accordance with another aspect of the present invention, a communication device supporting uniform resource identifier is provided. The communication device comprises at least one processor and at least one memory including program code, wherein when the program code is executed by the processor, the communication device is configured to: receive a communication input comprising a telephone number or a uniform resource identifier; determine whether the communication input comprises a uniform resource identifier; select a session initiation protocol account or an IP multimedia subsystem account registered in the communication device when the communication input comprises a uniform resource identifier; and utilize the selected session initiation protocol account or IP multimedia subsystem account to make a phone call to an account corresponding to the uniform resource identifier of the communication input. In particular, the communication device is further configured to determine whether a user name of the uniform resource identifier of the communication input is a number when the phone call is failed; and use the number of the user name to make a second phone call when the user name of the uniform resource identifier of the communication input is a number. In some embodiments, when a plurality of session initiation protocol accounts and/or IP multimedia subsystem accounts are registered in the communication device, the communication device is further configured to allow a user to select one of the plurality of session initiation protocol accounts and/or IP multimedia subsystem accounts to make a phone call, or the selection is proceeded automatically.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
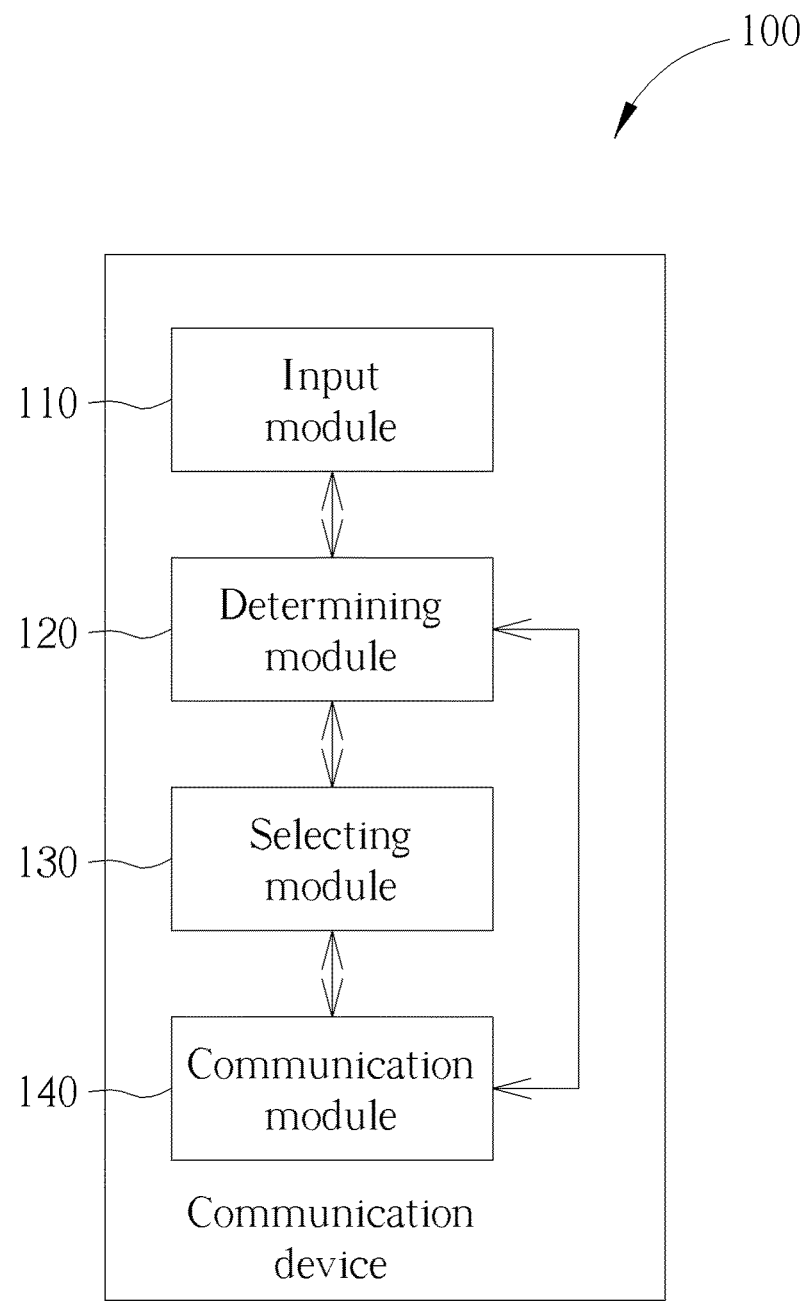
FIG. 1 is a functional block diagram of a communication device according to an embodiment of the present invention.

Please refer to FIG. 1. FIG. 1 is a block diagram of a communication device according to an embodiment of the present invention. The communication device supports a uniform resource identifier. Examples of the communication device may include, but not limited to, a mobile phone, a tablet, a wearable electronic device (e.g. a watch, glasses, etc.), an Internet of Things (IOT) device and a personal computer such as a laptop computer. As shown in FIG. 1, the communication device 100 comprises an input module 110, a determining module 120, a selecting module 130 and a communication module 140. The input module 110 is configured to provide a telephone interface for receiving a communication input of a user when the user is going to make a phone call. The input module 110 may receive communication inputs indifferent formats, such as a telephone number or a uniform resource identifier (URI). The determining module 120 is configured to determine related information of the communication input. For example, after the input module 110 receives the communication input, the determining module 120 may determine whether the communication input comprises a telephone number or a uniform resource identifier. The selecting module 130 is configured to select a communication account in the communication device when the determining module 120 determines that the communication input comprises the uniform resource identifier, where the communication account is capable of using the uniform resource identifier for communication. Since the uniform resource identifier may be applied to the session initiation protocol (SIP) communication technique and the IP multimedia subsystem (IMS) communication technique, when the determining module 120 determines that the communication input comprises the uniform resource identifier, the selecting module 130 may select a session initiation protocol account or an IP multimedia subsystem account registered in the communication device to make a phone call. The communication module 140 is configured to utilize the session initiation protocol account or IP multimedia subsystem account selected by the selecting module 130 to make a phone call to an account corresponding to the uniform resource identifier of the communication input. According to an embodiment, the communication module 140 is a fourth generation mobile communication module, and supports the session initiation protocol communication technique and the IP multimedia subsystem communication technique. And the communication device is configured to make phone calls through a fourth generation mobile communication network.

According to an embodiment, the input module 110, the determining module 120, the selecting module 130 and the communication module 140 may be implemented or controlled by at least one processor (e.g. system processor, general-purpose processor, application processor, etc.). The at least one processor may execute program code(s) (e.g. program instructions) to realize above mentioned features. Although the program code(s) may be contained in the at least one processor, it can be stored in any storage (e.g. at least one memory) located anywhere that the at least one processor can access. For example, one or more modules within the input module 110, the determining module 120, the selecting module 130 and the communication module 140 can be program modules running on the aforementioned at least one processor. This is for illustrative purposes only, and is not meant to be a limitation of the present invention.

Figure 2:
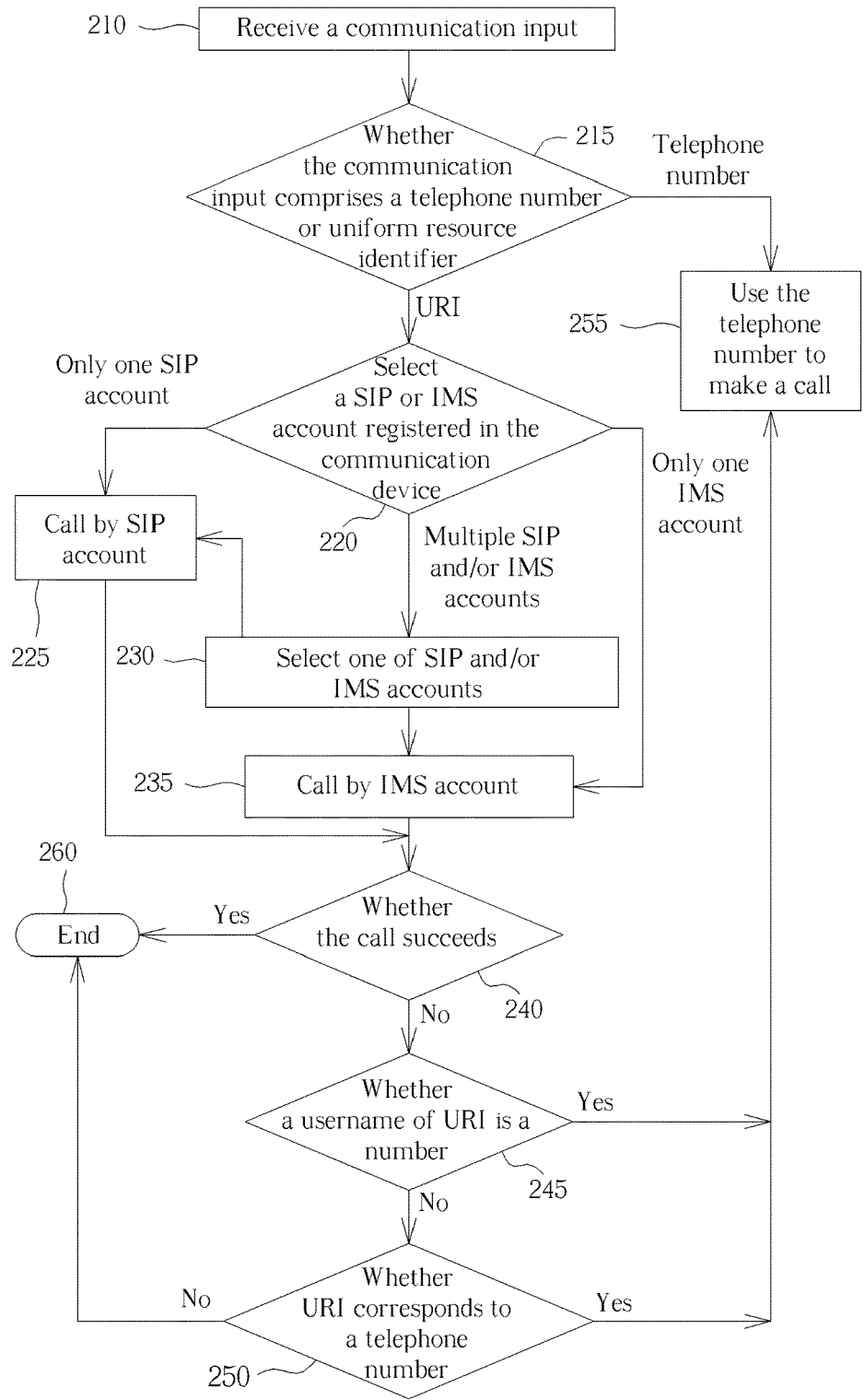
FIG. 2 is a flowchart showing a communication method supporting uniform resource identifier according to an embodiment of the present invention.

Please refer to FIG. 2 together with FIG. 1. FIG. 2 is a flowchart showing a communication method supporting uniform resource identifier according to an embodiment of the present invention. As shown in FIG. 2, in step 210, the input module 110 provides a telephone interface for receiving a communication input of a user. The communication input of the user can be a telephone number or a uniform resource identifier. In step 215, the determining module 120 determines whether the communication input comprises a telephone number or a uniform resource identifier. When the determining module 120 determines that the communication input comprises a telephone number, go to step 255; and when the determining module 120 determines that the communication input comprises a uniform resource identifier, go to step 220. In step 255, the communication module 140 uses the telephone number to make a phone call. In step 220, the selecting module 130 selects a session initiation protocol account or IP multimedia subsystem account registered in the communication device 100 to make a phone call. If only one session initiation protocol account is registered in the communication device 100, the selecting module 130 selects the session initiation protocol account for performing step 225. If only one IP multimedia subsystem account is registered in the communication device 100, the selecting module 130 selects the IP multimedia subsystem account for performing step 235. If a plurality of session initiation protocol accounts and/or IP multimedia subsystem accounts are registered in the communication device 100, go to step 230. In Step 230, the selecting module 130 selects one of the plurality of session initiation protocol accounts and/or IP multimedia subsystem accounts for performing step 225 or step 235. In step 225, the communication module 140 utilizes the session initiation protocol account selected by the selecting module 130 to make a phone call to an account corresponding to the uniform resource identifier of the communication input. In step 235, the communication module 140 uses the IP multimedia subsystem account selected by the selecting module 130 to make a phone call to the account corresponding to the uniform resource identifier of the communication input. The selecting module 130 may allow the user to select one of the plurality of session initiation protocol accounts and/or IP multimedia subsystem accounts registered in the communication device 100 to make a phone call, or the selecting module 130 may select one of the plurality of session initiation protocol accounts and/or IP multimedia subsystem accounts registered in the communication device 100 to make a phone call according to a predetermined preference (such as a regularly used account). This is for illustrative purposes only, and is not meant to be a limitation of the present invention.

In step 240, when the communication module 140 successfully makes a phone call to the account corresponding to the uniform resource identifier of the communication input, go to step 260, and the process ends. If the communication module 140 fails to make a phone call to the account corresponding to the uniform resource identifier of the communication input, go to step 245. In step 245, the determining module 120 further determines whether a user name of the uniform resource identifier of the communication input is a number. When the determining module 120 determines that the user name of the uniform resource identifier of the communication input is a number, step 255 is then performed for allowing the communication module 140 to use the number of the user name to make a phone call. Since the number of the user name might be a telephone number of a call recipient, it is possible to reach the call recipient by using the number of the user name to make a phone call. When the determining module 120 determines that the user name of the uniform resource identifier of the communication input is not a number, go to step 250. In step 250, the determining module 120 further determines whether the uniform resource identifier of the communication input corresponds to one of telephone numbers in the communication device 100. When the determining module 120 determines that the uniform resource identifier of the communication input corresponds to one of telephone numbers in the communication device 100, step 255 is then performed for allowing the communication module 140 to use the telephone number corresponding to the uniform resource identifier of the communication input to make a phone call.

The steps of the flowchart need not be in the exact order shown in FIG. 2, and other steps can be intermediate. In addition, those skilled in the art may omit some steps according to the spirit of the present invention. For example, steps 240-260 are steps for facilitating the user to make a phone call, as such, these steps can be omitted. The present invention is not limited thereto.

According to the above arrangement, the communication device 100 of the present invention may allow the user to input the uniform resource identifier into the telephone interface in order to use the session initiation protocol account or IP multimedia subsystem account to make a phone call. Moreover, when the phone call to the account corresponding to the uniform resource identifier of the communication input is failed, the communication device 100 of the present invention may further obtain the telephone number of the call recipient according to the uniform resource identifier, in order to use the telephone number to reach the call recipient. The present invention is not limited thereto.

Figure 3:
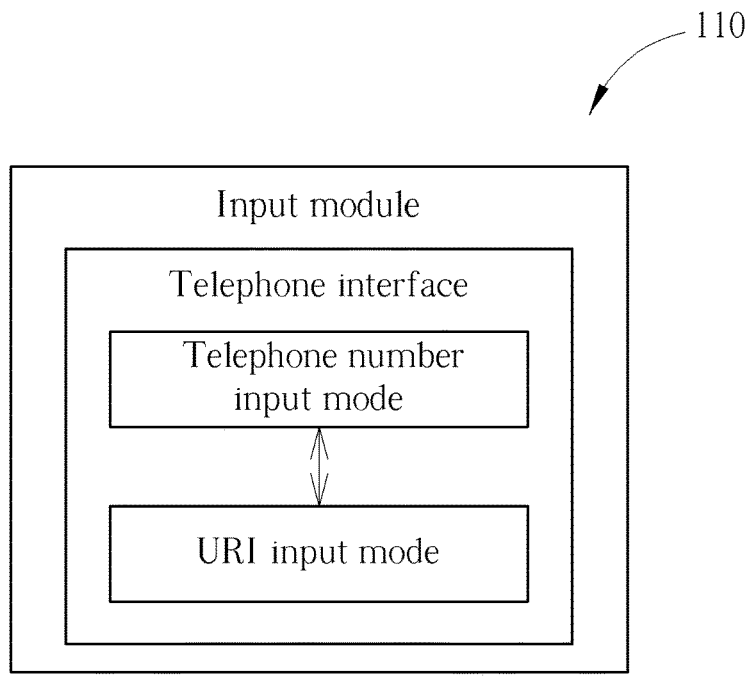
FIG. 3 is a diagram showing an input module according to an embodiment of the present invention.

Please refer to FIG. 3. FIG. 3 is a diagram showing an input module according to an embodiment of the present invention. As shown in FIG. 3, a telephone interface of the input module 110 of the present invention may provide two input modes, such as a telephone number input mode and a uniform resource identifier input mode. The telephone number input mode and the uniform resource identifier input mode can be switched in the same telephone interface. When the telephone interface is in the telephone number input mode, the telephone interface may allow the user to input numbers. When the telephone interface is in the uniform resource identifier input mode, the telephone interface may allow the user to input English alphabets, numbers, and symbols.

Figure 4:
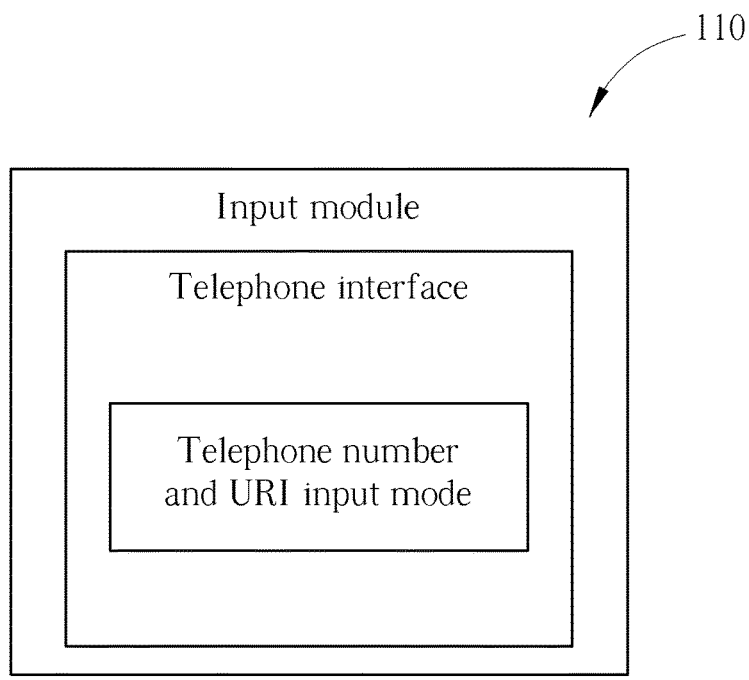
FIG. 4 is a diagram showing an input module according to another embodiment of the present invention.

Please refer to FIG. 4. FIG. 4 is a diagram showing an input module according to another embodiment of the present invention. As shown in FIG. 4, a telephone interface of the input module 110 of the present invention has a single input mode, such as a telephone number and uniform resource identifier input mode. In the above mode, the telephone interface may allow the user to input English alphabets, numbers, and symbols.

Figure 5:
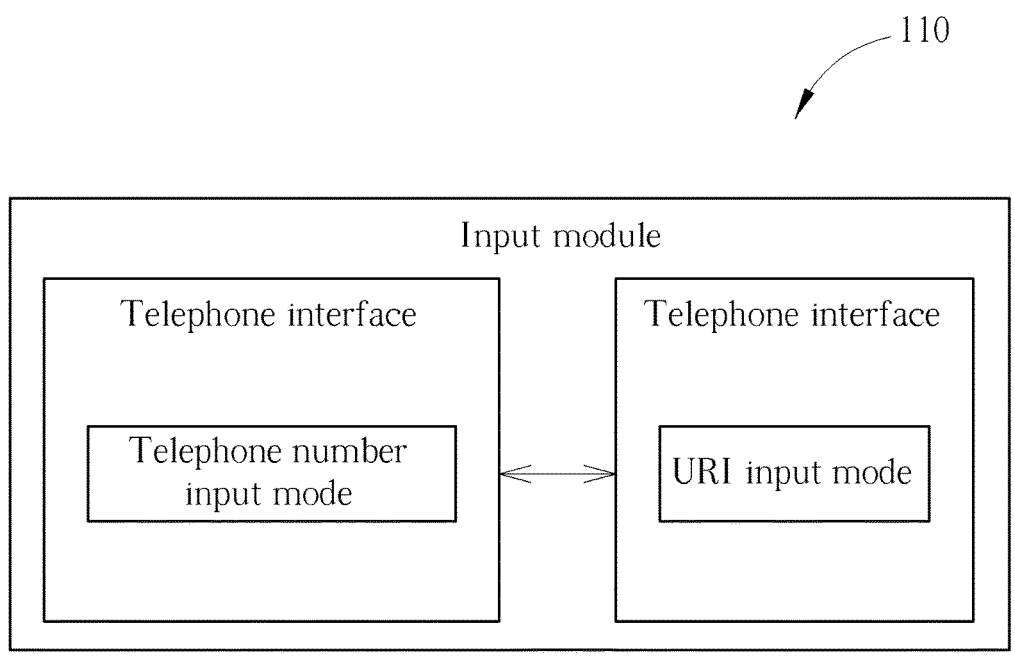
FIG. 5 is a diagram showing an input module according to another embodiment of the present invention.

Please refer to FIG. 5. FIG. 5 is a diagram showing an input module according to another embodiment of the present invention. As shown in FIG. 5, the input module 110 of the present invention has two telephone interfaces respectively providing a telephone number input mode and a uniform resource identifier input mode. When the user switches the input mode to the other one, the input module 110 changes the telephone interface correspondingly. When the user uses the telephone interface providing the telephone number input mode, the telephone interface may allow the user to input numbers. When the user uses the telephone interface providing the uniform resource identifier input mode, the telephone interface may allow the user to input English alphabets, numbers, and symbols.

In the above embodiments, the telephone interfaces of the input module 110 are for illustrative purposes only, and are not meant to be a limitation of the present invention.

In contrast to the prior art, the communication method and the communication device of the present invention may allow a user to select to input a telephone number or a uniform resource identifier into a telephone interface for making a phone call. Therefore, the user can rapidly and conveniently use functions of the IP multimedia subsystem to communicate with a call recipient. Moreover, when failing to use the IP multimedia subsystem to make a phone call, the present invention can further obtain the telephone number of the call recipient according to the uniform resource identifier, in order to use the telephone number to make a phone call. Therefore, through the present invention, better communication efficiency and elasticity can be obtained.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication method supporting uniform resource identifier, applicable to a communication device, the communication method comprising:
   receiving a communication input comprising a telephone number or a uniform resource identifier;
   determining whether the communication input comprises a uniform resource identifier;
   selecting a session initiation protocol account or an IP multimedia subsystem account registered in the communication device when the communication input comprises a uniform resource identifier; and
   utilizing the selected session initiation protocol account or IP multimedia subsystem account to make a phone call to an account corresponding to the uniform resource identifier of the communication input.

2. The communication method supporting uniform resource identifier of claim 1 further comprising:
   determining whether a user name of the uniform resource identifier of the communication input is a number when the phone call is failed; and
   using the number of the user name to make a second phone call when determining that the user name of the uniform resource identifier of the communication input is a number.

3. The communication method supporting uniform resource identifier of claim 1 further comprising:
   determining whether the uniform resource identifier of the communication input corresponds to one of telephone numbers in the communication device when the phone call is failed; and
   using a telephone number corresponding to the uniform resource identifier of the communication input to make a second phone call when the uniform resource identifier of the communication input corresponds to one of telephone numbers in the communication device.

4. The communication method supporting uniform resource identifier of claim 1 further comprising when a plurality of session initiation protocol accounts and/or IP multimedia subsystem accounts are registered in the communication device, allowing a user to select one of the plurality of session initiation protocol accounts and/or IP multimedia subsystem accounts to make a phone call.

5. The communication method supporting uniform resource identifier of claim 1 further comprising when a plurality of session initiation protocol accounts and/or IP multimedia subsystem accounts are registered in the communication device, automatically selecting one of the plurality of session initiation protocol accounts and/or IP multimedia subsystem accounts to make a phone call.

* * * * *